(12) United States Patent
Baumgarte et al.

(10) Patent No.: US 8,871,138 B2
(45) Date of Patent: Oct. 28, 2014

(54) METHOD AND DEVICE FOR BLOW-MOLDING CONTAINERS

(75) Inventors: Rolf Baumgarte, Ahrensburg (DE); Frank Lewin, Tangstedt (DE); Michael Litzenberg, Geesthacht (DE); Michael Linke, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 476 days.

(21) Appl. No.: 13/264,483

(22) PCT Filed: Mar. 29, 2010

(86) PCT No.: PCT/DE2010/000389
§ 371 (c)(1),
(2), (4) Date: Jan. 3, 2012

(87) PCT Pub. No.: WO2010/118728
PCT Pub. Date: Oct. 21, 2010

(65) Prior Publication Data
US 2012/0098165 A1    Apr. 26, 2012

(30) Foreign Application Priority Data
Apr. 16, 2009   (DE) .......................... 10 2009 019 008

(51) Int. Cl.
| | |
|---|---|
| B29C 49/64 | (2006.01) |
| B29C 49/78 | (2006.01) |
| B29C 49/42 | (2006.01) |
| B29C 33/26 | (2006.01) |
| B29C 49/06 | (2006.01) |
| B29C 49/12 | (2006.01) |
| B29C 49/48 | (2006.01) |
| B29K 67/00 | (2006.01) |
| B29L 31/00 | (2006.01) |

(52) U.S. Cl.
CPC ........... *B29C 49/783* (2013.01); *B29C 49/4236* (2013.01); *B29C 33/26* (2013.01); *B29C 49/06* (2013.01); *B29C 49/12* (2013.01); *B29C 49/6418* (2013.01); *B29C 2049/4889* (2013.01); *B29K 2067/00* (2013.01); *B29L 2031/7158* (2013.01); *B29C 49/4284* (2013.01); *B29C 49/4289* (2013.01)
USPC .......................... 264/535; 264/40.3; 264/538

(58) Field of Classification Search
None
See application file for complete search history.

(56) References Cited

U.S. PATENT DOCUMENTS

| | | | | |
|---|---|---|---|---|
| 5,817,348 | A * | 10/1998 | Ikeda ............................. | 425/529 |
| 5,895,666 | A * | 4/1999 | Brilman .......................... | 425/1 |
| 6,709,611 | B1 * | 3/2004 | Emmer et al. ............. | 264/37.16 |
| 2007/0085246 | A1 * | 4/2007 | Jaksztat et al. ................ | 264/532 |
| 2007/0292550 | A1 * | 12/2007 | Klatt et al. .................... | 425/183 |

\* cited by examiner

*Primary Examiner* — Monica Huson
(74) *Attorney, Agent, or Firm* — Lucas & Mercanti, LLP; Klaus P. Stoffel

(57) ABSTRACT

The invention relates to a method and a device for blow-molding containers. Following thermal conditioning inside a blow-mold of a blow-molding machine, a preform (1) is formed into the container (2) by means of blowing pressure. The necessary blow-molding gas (P1, P2) is provided by a supply device. The stored, pneumatic pressure energy inside the blown container is at least partially transformed into another form of energy.

18 Claims, 6 Drawing Sheets

METHOD AND DEVICE FOR BLOW-MOLDING CONTAINERS

The present application is a 371 of International application PCT/DE2010/000389, filed Mar. 29, 2010, which claims priority of DE 10 2009 019 008.2, filed Apr. 16, 2009, the priority of these applications is hereby claimed and these applications are incorporated herein by reference.

BACKGROUND OF THE INVENTION

The invention relates to a method for blow-molding containers in which a preform, after a thermal conditioning within a blow-mold of a blow-molding machine, is shaped by the influence of blowing pressure into the container, as well as in which a blowing gas is made available from a supply unit.

The invention further relates to an apparatus for blow-molding containers which includes at least one blow-molding station with a blow-mold, and in which the blow-molding station is connected to a pneumatic supply device.

In a container shaping under the influence of blowing pressure, preforms of a thermoplastic material, for example, preforms of PET (polyethylene terephthalate), are supplied to different processing stations within the blow-molding machine. Such a blow-molding machine typically includes a heating device as well as a blowing device in whose area the previously thermally conditioned preform is expanded into a container through biaxial orientation. The expansion takes place by means of compressed air which is conducted into the preform to be expanded. The sequence in such an expansion of the preform in accordance with process technology is explained in DE-OS 43 40 291. The introduction of the pressurized gas mentioned above also includes the introduction of compressed gas into the developing container bubble as well as the introduction of compressed gas into the preform at the beginning of the blow process.

The basic construction of a blow-molding station for the container shaping is described in DE-OS 42 12 583. Possibilities for thermally conditioning the preforms are explained in DE-OS 23 52 926.

Within the apparatus for blow-molding, the preforms as well as the blow-molded containers can be transported by means of different manipulating devices. Particularly useful has been found the use of transport mandrels onto which the preforms are placed. However, the preforms can also be manipulated by other support devices. The use of gripping tongs for manipulating preforms and the use of spreading mandrels, which for providing support can be inserted into an opening area of the preform, are also among the available constructions.

A manipulation of containers with the use of transfer wheels is described, for example, in DE-OS 199 06 438 in an arrangement of a transfer wheel between a blow-molding wheel and a discharge section.

The manipulation of the preforms already described above takes place, on the one hand, in the so called two-stage methods in which the preforms are initially manufactured in a blow-molding method, are subsequently subjected to intermediate storage, and are only later conditioned with respect to their temperature and are blown up into a container. On the other hand, an application of the so called single-stage method in which the preforms are suitably thermally conditioned directly after their manufacture according to blow-molding technology and a sufficient solidification, and are subsequently expanded.

Different embodiments are known in the art with respect to the blow-molding stations used. In blow-molding stations which are arranged on rotating transport wheels, a book-like opening capability of the mold supports can be found frequently. However, it is also possible to use mold supports which are slidable relative to each other or are guided in different ways. In stationary blow-molding stations which are particularly suitable for receiving several cavities for the shaping of containers, typically plates which are arranged parallel relative to each other are used as mold supports.

A supply of the blow-molding station with blowing gas particularly with compressed air, as a rule takes place through one or more compressors. The compressor used is typically provided with a compressor control and a pressed air storage is installed between the compressor and the blow-molding machine. The compressor control controls the compressor in such a way that a predetermined pressure level is maintained in the area of the compressed air storage. The compressor control is typically adjusted in such a way that in the area of the compressed air storage a pressure level of about 38 bar is made available. The blow-molding machine is provided with a compressed air control which reduces the pressure made available by the compressed air storage to a pressure level as it is specifically required for shaping the container.

A significant portion of the running operating costs for the blow-technological manufacture of the containers results from making available the required blowing air. For reducing these costs it is known, for example, to use the blowing air several times and to conduct the used blowing air of a high pressure level on a lower pressure level once again to the container shaping operation. Since such a recycling of blowing air cannot be used in all cases on a substantial scale, by realization of such a recycling alone, the requirements with respect to a significant reduction of the operating costs can still not be met in a completely satisfying manner.

In the already known methods for blowing air recycling, the predominant portion of the compressed air compressed into the containers is also discharged into the atmosphere. When returning used blowing air, starting from a rotating blowing air supply back into a stationary factory part, substantial line lengths occur and a complex pneumatic system is generated.

SUMMARY OF THE INVENTION

Therefore, it is the object of the present invention to improve a method of the above described type in such a way that a reduction of the operating costs is reinforced.

In accordance with the invention, this object is met by transforming at least a portion of the pneumatic pressure energy stored within the blow-molded container into another type of energy.

It is another object of the present invention to construct an apparatus of the above mentioned type in such a way that reduced operating costs are achieved.

In accordance with the invention, this object is met by coupling the blow-molding station to a transformation device in such a way that at least a portion of the pneumatic pressure energy stored within the blow-molded container is transformable into another energy type.

By transforming the pneumatic energy into an energy form which differs from the pneumatic energy, it is possible to recuperate a substantial portion of the energy contained in the used blowing air. In the known variations for the direct pneumatic re-use of the compressed air, the significant problem is the fact that it is not possible to reach the original pressure level once again. Accordingly, the used blowing air can only be used in an operating air zone or as preliminary pressure when carrying out the blow-molding procedure. However, a significant portion of the energy remains unused. The transformation of the pressure energy into another type of energy by using this energy to be able to carry out a renewed gas compression to basically any predeterminable pressure level and, in particular, to once again make available the required principal blowing pressure.

In particular, it is intended that the transformation of the pressure energy into the other energy type as well as the renewed blowing pressure generation in the area of the blow-molding machine itself. As a result, a very compact and easily understandable plant is made available without the operator having to attend to complex and spatially distributed plant components.

A compact embodiment is reinforced by carrying out a transformation of the pressure energy into mechanical drive energy for a blow wheel of a blow-molding machine.

An increased variety of embodiments in the realization of the system is made available by transforming the pressure energy into electric energy.

A mechanically stable embodiment achieved by transforming the pressure energy by using at least one piston/cylinder arrangement.

For facilitating a significant force equalization during the compression and decompression procedures, it is proposed to arrange at least two blow-molding stations on the blow wheel.

A simple energy transformation is reinforced by transforming the pressure energy through a contact between a cam roller and a cam track into mechanical drive energy.

For the force pickup, it has been found advantageous that the cam roller rotates with the blow wheel and the cam track is arranged so as to be stationary.

A continuous operation with constant operating parameters is reinforced by transforming a portion of the drive energy of the blow wheel with the use of at least one piston/cylinder arrangement into pneumatic pressure energy which is supplied to a reservoir tank.

Exactly reproducible process sequences are achieved by carrying out at least a portion of the energy transformation by a cam control.

The adherence to a predetermined pressure level is reinforced in that a predeterminable gas flow direction is predetermined by at least one check valve.

DETAILED DESCRIPTION OF THE INVENTION

Figure 1:
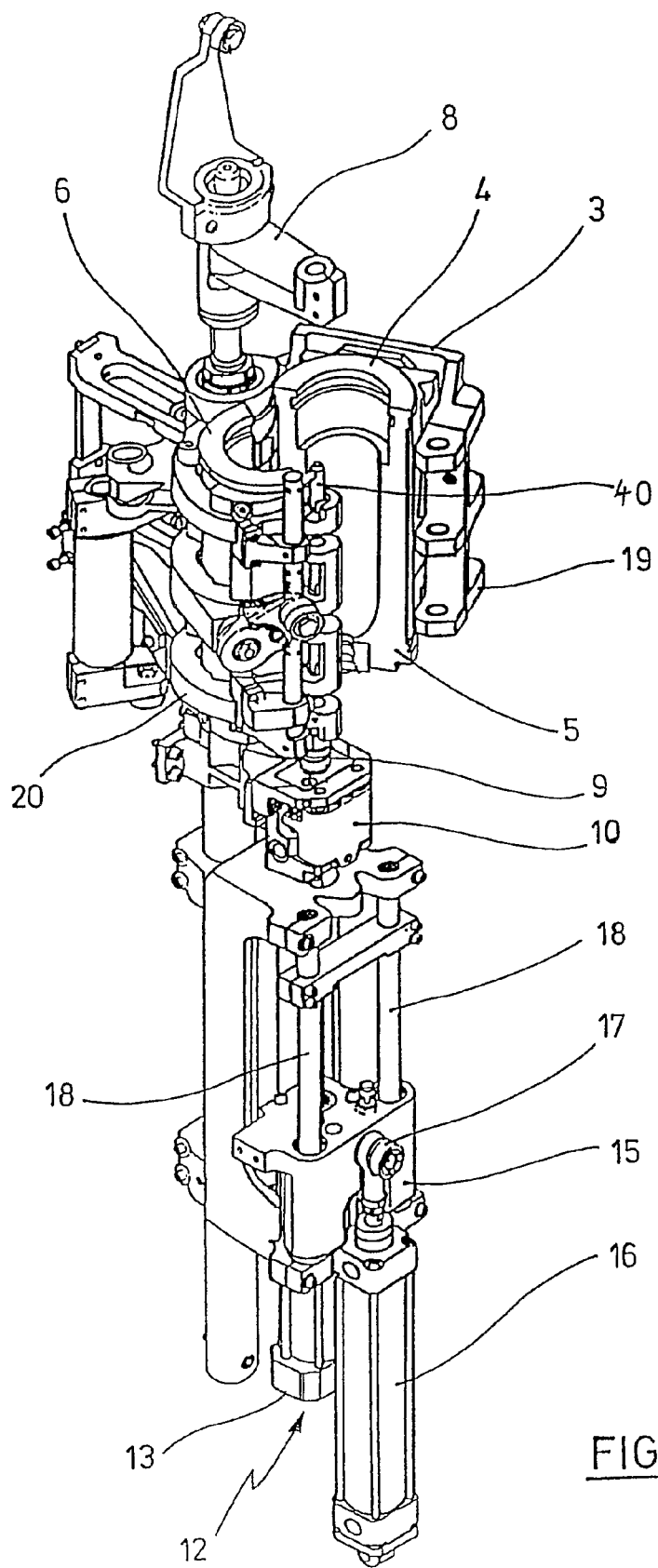
FIG. 1 is a perspective illustration of a blow-molding station for manufacturing containers from preforms.
Figure 2:
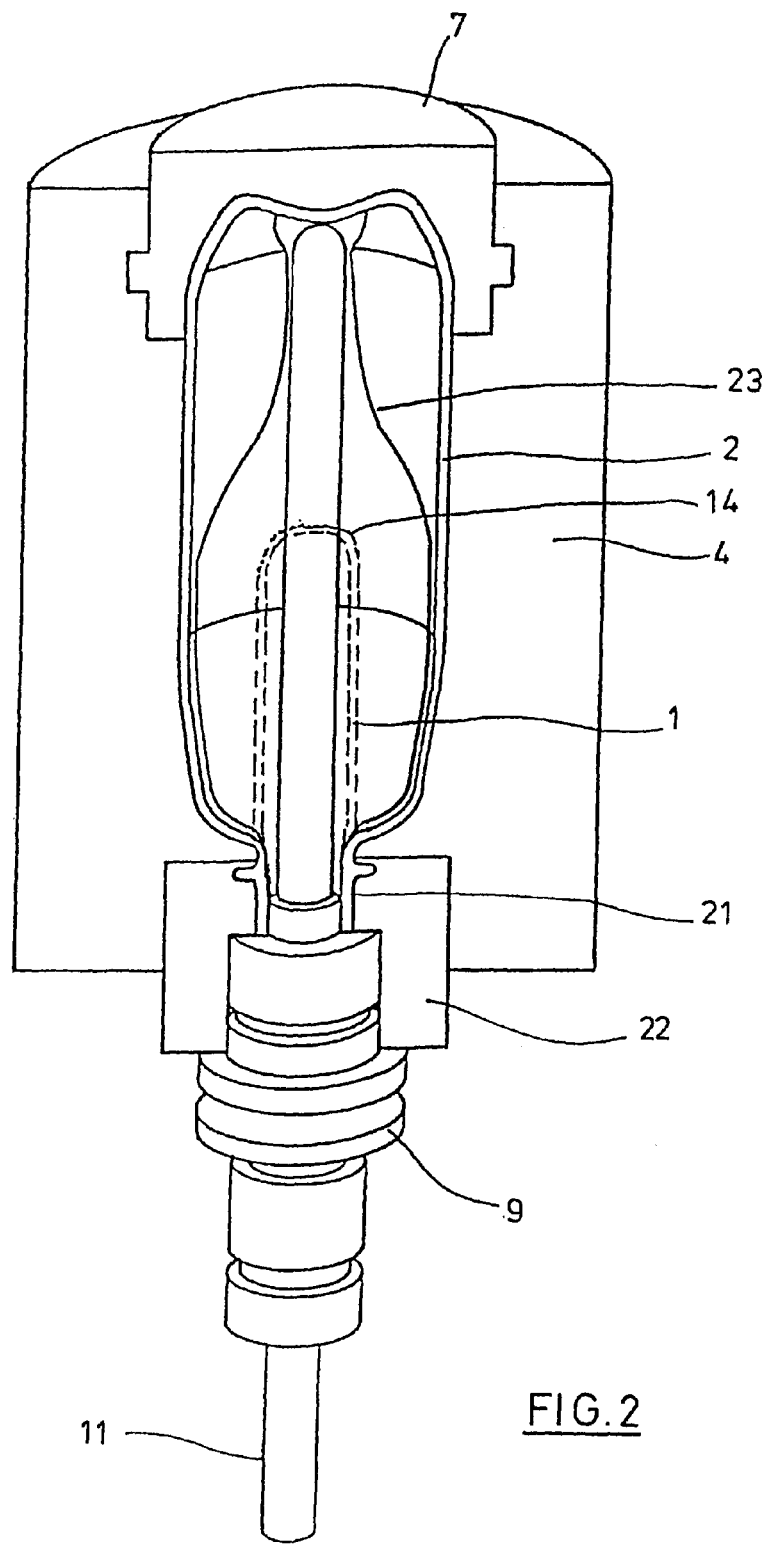
FIG. 2 shows a longitudinal sectional view through a blow-mold in which a preform is stretched and expanded.

The principal construction of a device for shaping preforms 1 into containers 2 is illustrated in FIG. 1 and in FIG. 2.

The apparatus for shaping container 2 consists essentially of a blow-molding station 3 which is provided with a blow-mold 4 into which a preform 1 can be placed. The preform 1 may be an injection molded part of polyethylene terephthalate. For facilitating a placement of the preform 1 into the blow-mold 4 and for facilitating a removal of the finished container 2, the blow-mold 4 is composed of mold halves 5, 6 and a bottom part 7 which can be positioned by a lifting device 8. The preform 1 can in the area of the blow-molding station 3 by a transport mandrel 9 which together with the preform 1 travels through a plurality of treatment stations within the apparatus. However, it is also possible to place the preform 1, for example, by means of tongs or other manipulating means directly into the blow-mold 4.

For facilitating a compressed air supply, a connecting piston 10 is arranged underneath the transport mandrel 9, wherein the connecting piston 10 supplies compressed air to the preform 1 and simultaneously provides a sealing action relative to the transport mandrel 9. However, in a modified construction, it is basically also conceivable to use fixed compressed air supply lines.

In this embodiment, stretching of the preform 1 takes place by means of a stretching rod 11 which is positioned by a cylinder 12. In accordance with another embodiment, a mechanical positioning of the stretching rod 11 is effected through cam segments which are acted upon by sensing rollers. The use of cam segments is particularly useful in those cases in which a plurality of blow-molding stations 3 are arranged on a rotating blow-molding wheel.

In the embodiment illustrated in FIG. 1, the stretching system is constructed in such a way that a tandem arrangement of two cylinders 12 is made available. By means of a primary cylinder 13, the stretching rod 11 is initially prior to the beginning of the actual stretching process into a bottom 14 of the preform 1. During the actual stretching process, the primary cylinder 13 is positioned with extended stretching rod together with a carriage 15 which supports the primary cylinder 13 by a secondary cylinder 16 or through a cam control. In particular, it is intended to use the secondary cylinder 16 with a cam control in such a way that an actual stretching position is predetermined by a guide roller 17 which slides along a cam track while the stretching process is taking place. The guide roller 17 is pressed by the secondary cylinder 16 against the guide track. The carriage 15 slides along two guide elements 18.

After closing the mold halves 5, 6 arranged in the area of supports 19, 20, blocking of the supports 19, 20 relative to each other takes place by means of a locking device 40.

For adapting to different shapes of an opening section 21 of the preform 1, in accordance with FIG. 2 the use of separate threaded inserts 22 in the area of the blow-mold 4 is provided.

FIG. 2 shows in addition to the blow-molded container 2 also the preform 1 in broken lines and schematically a developing container bubble 23.

Figure 3:
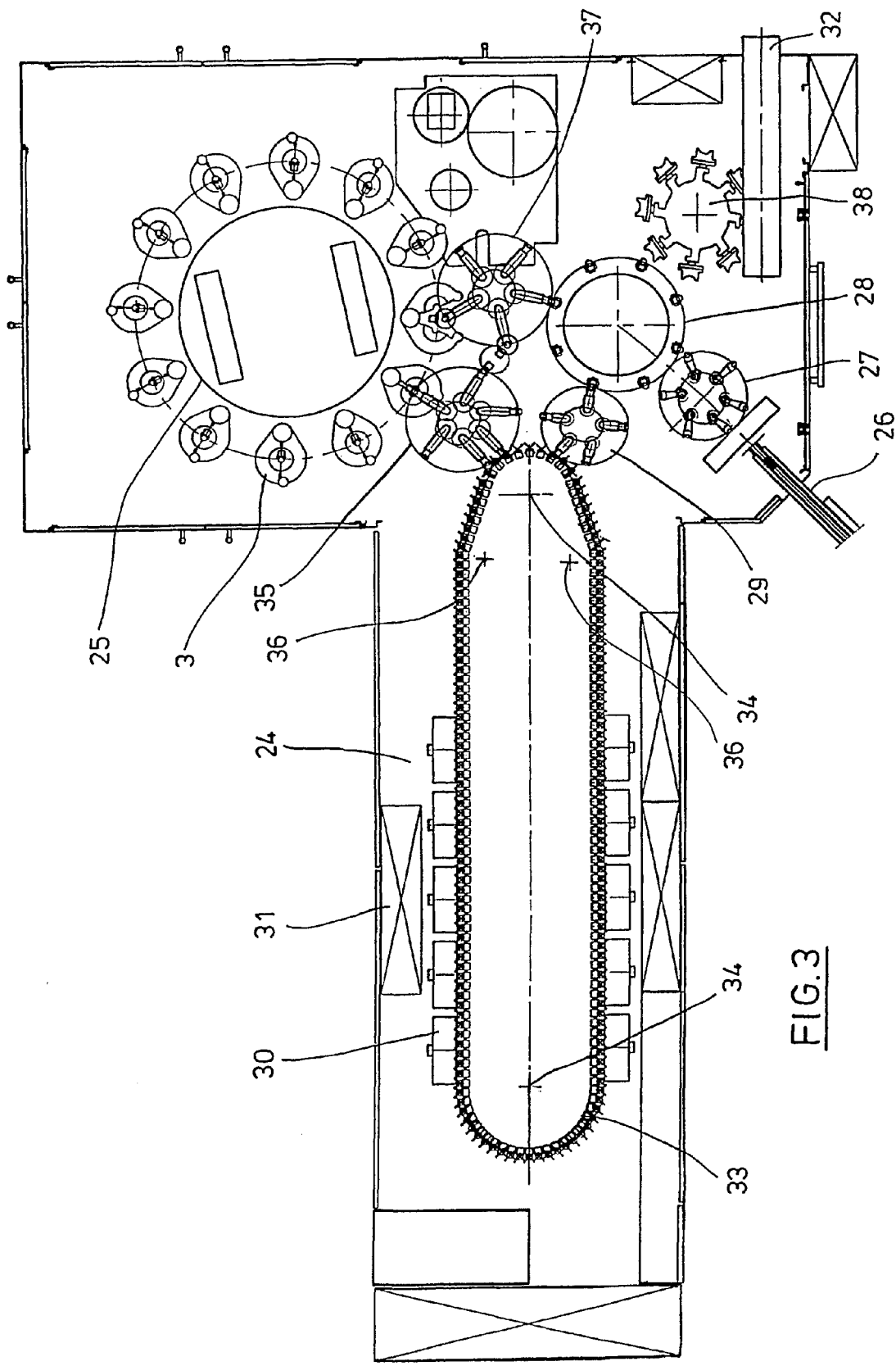
FIG. 3 is a sketch for illustrating a basic configuration of an apparatus for blow-molding containers.

FIG. 3 shows the basic construction of a blow-molding machine which is provided with a heating section 24 as well as a rotating blow-molding wheel 25. Starting from a preform inlet 26, the preforms 1 are transported by transfer wheels 27, 28, 29 into the area of the heating section 24. Heating radiators 30 as well as blowers 31 are arranged along the heating section 24 for thermally conditioning the preforms 1. After a sufficient thermal conditioning of the preforms 1, they are transferred to the blow-molding wheel 25 in whose area the blow-molding stations 3 are arranged. The finished, blow-molded containers 2 are supplied by additional transfer wheels to a discharge section 32.

In order to be able to shape a preform 1 into a container 2 in such a way that the container 2 has material properties which ensure a long usefulness of the foodstuffs filled into the container 2, particularly of beverages, special process steps must be adhered to during the heating and orientation of the preforms 1. Moreover, advantageous effects can be achieved by adhering to special dimensioning rules.

Different synthetic materials can be used as thermoplastic material for example, PET, PEN or PP can be used. The expansion of the preform 1 during the orientation process takes place through a compressed air supply. The compressed air supply is divided into a pre-blowing phase in which gas, compressed air, is supplied with a low pressure level and into a subsequent principal blowing phase in which gas is supplied at a higher pressure level. During the pre-blowing phase, typically compressed air with a pressure in the interval of 10 bar to 25 bar is used, and during the principal blowing phase compressed air having a pressure in the interval of 25 bar to 40 bar is supplied.

From FIG. 3 it can also be seen that, in the illustrated embodiment, the heating section 24 is formed by a plurality of circulating transport elements 33 which are arranged in a row in the manner of a chain and are guided along guide wheels 34. It is in particular intended to provide an essentially rectangular basic contour by the chain-like arrangement. In the illustrated embodiment, in the area of the extension of the heating section 24 facing a transfer wheel 29 and a feeding wheel 35, an individual guide wheel 34 having a relatively large dimension is used, and in the area of adjacent deflections two guide wheels 36 having a relatively smaller dimension are used. However, any chosen other guide means are conceivable.

For facilitating an arrangement of the transfer wheel 29 and a feeding wheel 35 which is as tight as possible, the illustrated arrangement has been found to be particularly useful because in the area of the corresponding extension of the heating section 24, three guide wheels 34, 36 are positioned, wherein the respectively smaller guide wheels 36 are positioned in the area of the transition to the linear portions of the heating sections 24 and the larger guide wheel 34 is positioned in the immediate transfer area of the transfer wheel 29 and the feeding wheel 35. As an alternative to the use of chain-like transport elements, it is also possible, for example, to use a rotating heating wheel.

After finishing blow-molding of the containers 2, the containers 2 are guided by a discharge wheel 37 out of the area of the blow-molding stations 3 and are transported through the transfer wheel 28 and a discharge wheel 38 to the discharge section 32.

Figure 4:
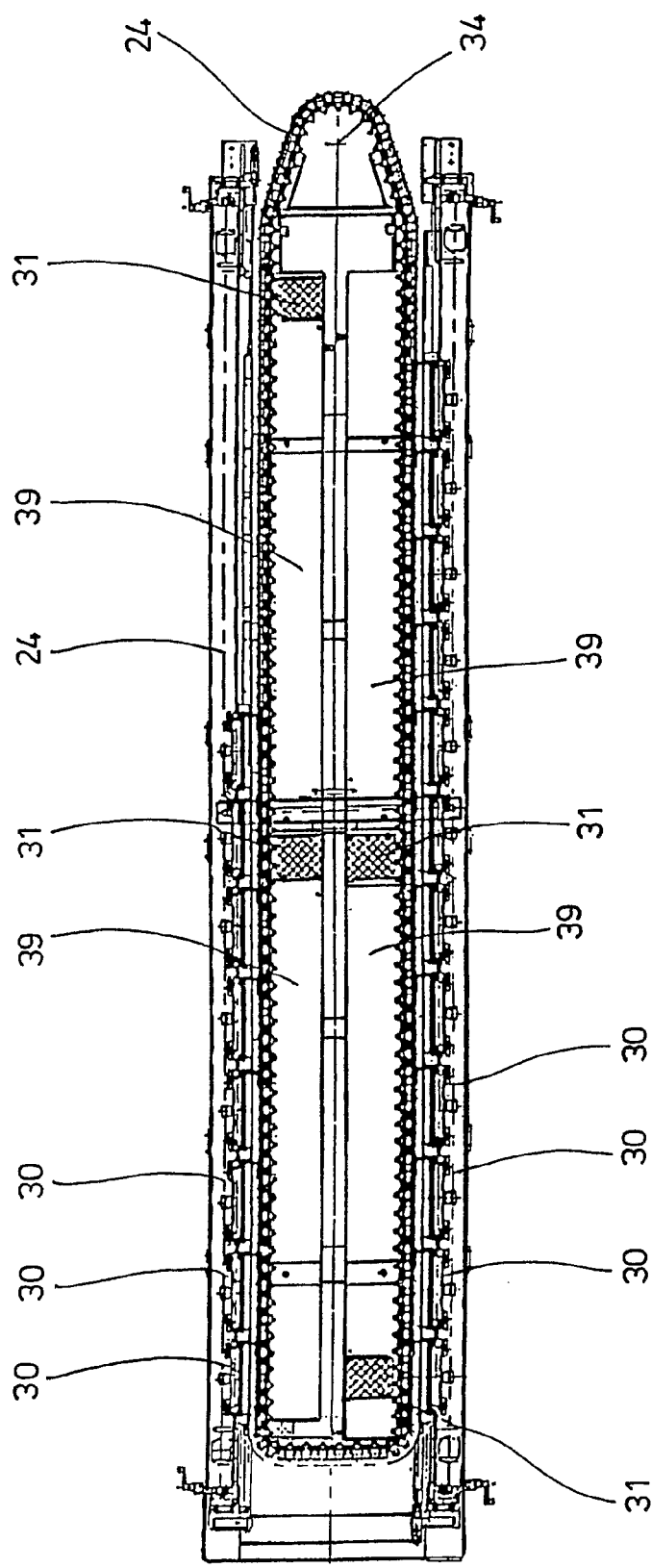
FIG. 4 shows a modified heating section within increased heating capacity.

In the modified heating section 24 illustrated in FIG. 4, because of the larger number of heating radiators 30, a larger quantity of preforms 1 can be thermally conditioned per unit of time. In this case, the blowers 31 conduct cooling air into the area of cooling air ducts 39 which are respectively located opposite the corresponding heating radiators 30 and discharge the cooling air through outlet openings. As a result of the arrangement of the output directions, a flow direction for the cooling air essentially transversely of a transport direction of the preforms 1 is realized. The cooling air ducts 39 can make available in the area of surfaces located opposite the heating radiators 30, reflectors for the heating radiation; also it is possible to realize cooling of the heating radiators 30 by means of the discharged cooling air.

Figure 5:
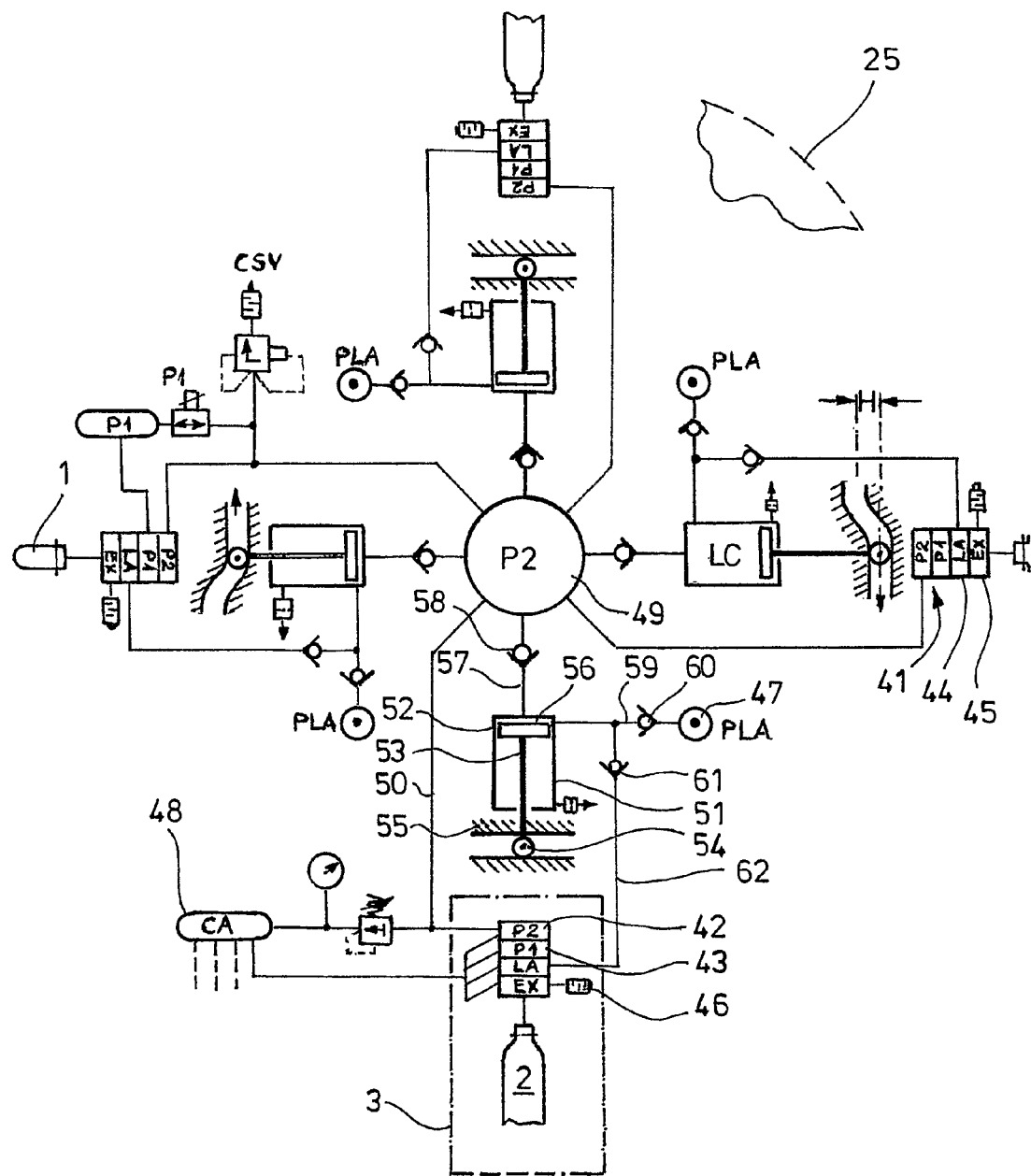
FIG. 5 is a schematic illustration for the energy transformation and for generating blowing pressure in the area of the blow-molding machine.

FIG. 5 schematically shows a pneumatic supply device for the blow-molding stations 4. The blow-molding stations 4 are each equipped with a valve block 41 which includes a principal pressure valve 42, a preliminary pressure valve 43, a transfer valve 44 and a ventilating valve 45 which typically is connected to a sound absorber 46. A corresponding preliminary pressure is typically in a range of 5 to 10 bar, preferably about 8 bar. The preliminary pressure is made available by a preliminary pressure supply 47. For actuating the valves 41, 42, 43, 44, a control pressure supply 48 is provided which operates at a pressure of about 10 bar.

Compressed gas having a pressure level corresponding to the principal blowing pressure is made available in the area of a storage tank 49. The storage tank 49 is connected through a connecting line 50 to the principal pressure valve 42. When the principal pressure valve is switched through, this has the result that the principal pressure is conducted into the interior of the preform 1 to be expanded or of the developing container 2.

In the illustrated embodiment, to each blow-molding station 3 is assigned at least one cylinder 51 in which a piston 52 is guided. Piston 50 is connected through a piston rod 53 to a cam roller 54. The cam roller 54 is guided along a cam track 55. A cylinder interior 56 is in the area of its extension facing away from the piston rod 53 connected through a line 57 and a check valve 58 to a supply tank 49. The check valve 58 is arranged in such a way that a gas flow is possible only from the cylinder interior 56 in the direction of the supply tank 49. Moreover, the area of the cylinder interior 56 facing the line 57 is connected through a connecting line 59 and a check valve 60 to the preliminary pressure supply 47.

Moreover, the connecting line 59 is connected through another check valve 61 and a line 62 to the transfer valve 44. The check valve 60 is switched in such a way that a gas flow is only possible from the preliminary pressure supply 47 in the direction toward the cylinder interior 56. The check valve 61 is switched in such a way that a gas flow is only possible from the transfer valve 44 in the direction toward the cylinder interior 56.

FIG. 5 schematically illustrates an arrangement with four blow-molding stations 3 which are arranged on a rotating blow-molding wheel 25. In the case of positioning on the left in the plane of the drawing, a preform 1 is placed in the corresponding blow-molding station 3. In the state of operation of the corresponding blow-molding station 3 illustrated in the drawing part on the right of FIG. 5, the pressure in the already finished blow-molded container 2 has been lowered. The other illustrations show process—technical intermediate positions.

The process sequence takes place as described below in the following in a substantially simplified manner. At a beginning of the blow-molding process, the preform 1 is initially supplied with the preliminary pressure from the preliminary pressure supply 47 and, subsequently, after the principal pressure valve 42 has been switched through, the preform 1 is supplied with the principal blowing pressure from the supply tank 49. After the blowing of the container 2 has been finished, the transfer valve 44 opens and the blowing medium which is under pressure flows from the blow-molded container 2 into the cylinder interior 46. At a beginning of this procedure the piston 52 has assumed a positioning which corresponds to the smallest volume of that portion of the cylinder interior 56 which is enclosed between the piston 52 and the corresponding connection area of the line 57.

The blowing air flowing into the cylinder interior 56 generates a pressure in the cylinder interior 56 which is transmitted from the cam roller 54 to the cam track 55. In the area of this movement of the piston 52, the cam track 55 has an inclined arrangement relative to a circumferential direction of the blow wheel 25, so that from the cam roller 54 a force is transmitted on to the cam track 55 whose corresponding counter force has a force component in the direction of movement of the blow wheel 25 and, as a result, leads to a drive of the blow wheel 25. The pressure energy stored in the blow-molded container 2 of the pressurized blowing gas is transformed into a mechanical drive energy for the blowing wheel 25.

After the piston 55 has assumed a positioning within the cylinder interior 56 which leads to a greatest achievable volume enclosed between the piston 52 and the connecting area of the line 57, a pattern of the cam track 55 is effected such that the piston 52 carries out a return stroke movement and once again compresses the enclosed air. When the principal blowing pressure has been reached the check valve 58 opens and pressurized gas is fed into the supply tank 48. As a result, the mechanical movement energy of the blow wheel 25 is once again transformed into a pneumatic pressure energy. The level of the achievable pneumatic pressure nearly is dependent on the elected mechanical structural border conditions.

Consequently, the mechanical drive energy generated when the blow gas was expanded, is utilized to once again generate pressurized gas during the subsequent process phases.

For carrying out the pressure lowering procedure in a defined manner with respect to time, it is provided to carry out the energy transformation of the pneumatic pressure energy into the mechanical drive energy only up to a predeterminable pressure threshold. For example, the pressure threshold may be at 8 bar. When reaching this pressure threshold, the ventilating valve 45 opens and the residual pressure contained in the container 2 is ventilated against the surrounding pressure. After a complete lowering of the pressure to ambient pressure, the blow-molded container 2 can be removed from the blow-molding station 3. The check valve 61 ensures that even in the case of a complete lowering of the pressure in the area of the container 2, pressure corresponding to the predetermined pressure threshold is maintained within the cylinder interior 56.

Ventilating the interior of the container 2 in the last process phase against the ambient pressure has the result that no complete return of energy is possible within the pneumatic-mechanical system. Thus, during the gas expansion, not enough mechanical drive energy is released for the blowing wheel 25 as would be required for compressing a sufficient quantity of blowing gas. The corresponding energy difference is made available by the drive motor of the blowing wheel 25. Therefore, compared to a conventional blow wheel drive it is necessary to use a stronger drive motor, typically an electrical three-phase motor. While the power increase in the area of this motor leads to an increased energy consumption in the area of the blow-molding machine, there is no substantial energy consumption in the area of the high pressure compressor which would otherwise be used.

In an optimum configuration of the system it is to be expected that the output of the blow wheel drive has to be increased by about 20% of that power which corresponds to the otherwise necessary output of the high pressure compressor. Accordingly, the resulting energy savings are in the order of magnitude of about 80% of the drive output of the conventionally required high pressure compressor.

The most important advantages of the transformation of the pneumatic pressure energy into mechanical drive energy for the blowing wheel and the derivation of the renewed compressed gas production from the movement of the blowing wheel 25, as illustrated in the embodiment according to FIG. 5 reside in the extremely compact construction which requires only relatively few interchanges with its surroundings. However, many different variations for energy recovery or transformation are conceivable.

In accordance with an embodiment, for example, it is intended to not convert the stored pressure energy within the blow-molded containers 2, but to drive an electrical generator with the use of the pressurized gas, wherein the generator transforms the compressed gas energy into electrical energy. For example, this electrical energy may be used for supplying a separate compressor. However, it is also conceivable to carry out only the gas compression with the use of a cylinder arrangement controlled by the blowing wheel 25 and to supply an appropriately larger drive motor for the blowing wheel 25.

It is considered essential with respect to the basic idea of the invention that with the use of the energy stored in the blow gas of the manufactured containers 2, pressurized blowing gas is generated which again is at a pressure level of the principal blowing pressure or to raise the pressurized gas once again to this pressure level.

The lowering of the internal pressure in the cylinder 51 as illustrated in the embodiment to a value between the ambient pressure and the principal blowing pressure has been found advantageous because this makes possible a reduction of the volume of the cylinder 51. The volume of the cylinder 51 results from the blowing gas volume necessary for blow-molding a container 2 and the factor of the necessary pressure increase in the cylinder 51 during the compression phase.

Figure 6:
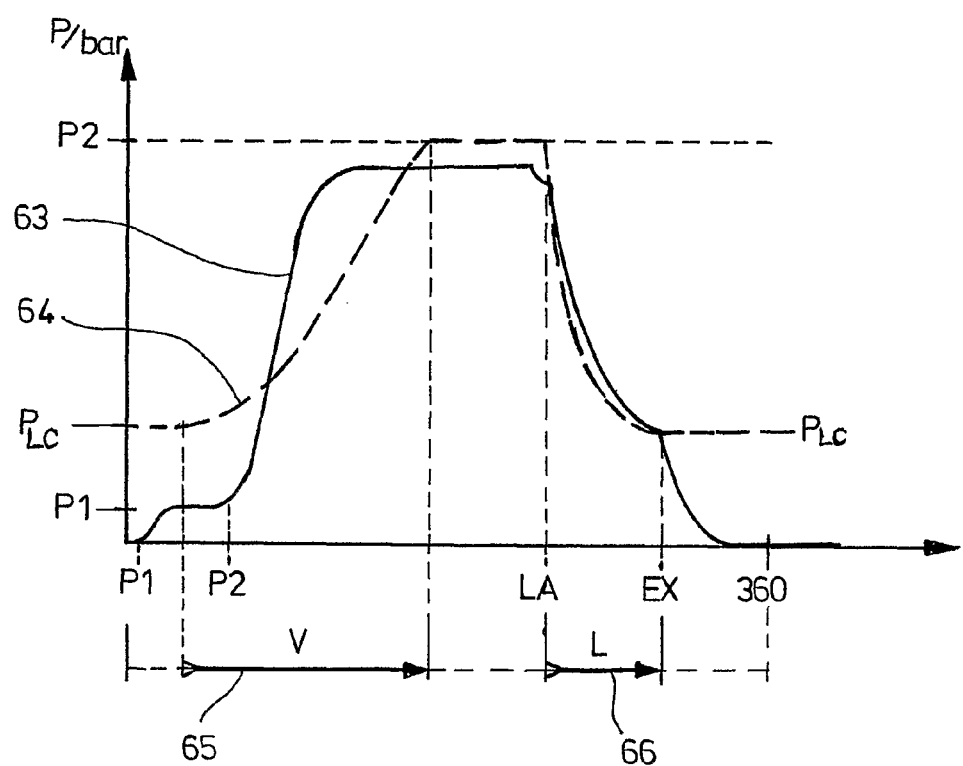
FIG. 6 is a schematic illustration of the blowing pressure pattern and the pressure pattern in the area of a cylindrical transformation device.

FIG. 6 shows a blowing pressure pattern 63 which prevails when the blowing procedure is carried out within the container 2, and a pressure sequence 64 within the cylinder interior 56. Compacting takes place during a time period 65, and the pressure supply from the interior of the container 2 into the cylinder interior 56 takes place within a time period 66. The entire process sequence extends over an illustrated process angle of 360% which corresponds to a complete rotation of the blowing wheel 25. The pressure P2 corresponds to a value in the range of 30 to 40 bar, typically about 32 bar. The pressure PLC is the residual pressure in the cylinder interior 56 and is about 8 bar.

With respect to a start-up of the blow-molding machine, it is considered to initially pre-charge the cylinder interior 56 with the use of the preliminary pressure supply 47 and to permit the blowing wheel 25 with the use of its principal drive without a blow-technological production of containers 2 until the operating pressure in the area of the supply tank 49 has been adjusted. Accordingly, an external high pressure is also not needed for a start-up. For avoiding operating energies which are too high during this start-up procedure, the blowing wheel 25 can during this charging phase be operated with a circumferential speed which is significantly reduced.

The invention claimed is:

1. A method for blow-molding containers, comprising the steps of: shaping a preform, after a thermal conditioning, into a container within a blow-mold of a blow-molding machine by influence of blowing pressure; providing blowing gas from a supply device; and transforming at least a portion of pneumatic pressure energy stored within the blow-molding container into another type of energy, including carrying out at least a portion of the energy transformation with a cam control.

2. The method according to claim 1, including carrying out a conversion of the pressure energy into mechanical drive energy for a blowing wheel of the blow-molding machine.

3. The method according to claim 1, including transforming the pressure energy into electric energy.

4. The method according to claim 1, wherein the transforming step includes transforming the pressure energy with aid of at least one piston/cylinder unit.

5. The method according to claim 2, including arranging at least two blowing-molding stations on the blowing wheel.

6. The method according to claim 2, wherein the transforming step includes transforming the pressure energy by contact between a cam roller and a cam track.

7. The method according to claim 6, wherein the cam roller rotates with the blowing wheel, and the cam track is arranged so as to be stationary.

8. The method according to claim 2, including transforming a portion of the drive energy of the blowing wheel into pneumatic pressure energy using at least one piston/cylinder arrangement, and supplying the pneumatic pressure energy to a storage tank.

9. The method according to claim 1, including predetermining a predeterminable gas flow direction by at least one check valve.

10. An apparatus for-blow molding containers, comprising: at least one blow-molding station with a blow-mold; a pneumatic supply device connected to the blow-molding station; and a transformation device, the blow-molding station being coupled to the transformation device so that at least a portion of pneumatic pressure energy stored within the blow-molded container is transformable into another type of energy, wherein the transformation device is coupled to a cam control.

11. The apparatus according to claim 10, wherein the transformation device is operatively constructed to produce mechanical drive energy.

12. The apparatus according to claim 10, wherein the transformation device is operatively constructed to produce electric energy.

13. The apparatus according to claim 10, wherein the transformation device includes at least one piston/cylinder arrangement.

14. The apparatus according to claim 10, further comprising a rotating blow wheel, at least two blow-molding stations being arranged on the rotating blow wheel.

15. The apparatus according to claim 14, further comprising at least one piston/cylinder arrangement in an area of the blowing wheel for producing pressurized gas.

16. The apparatus according to claim 15, and further comprising a stationary cam track and a cam roller, the piston/cylinder arrangement being arranged on the blow wheel and engaging in the stationary cam track through the cam roller.

17. The apparatus according to claim 15, and further comprising a storage tank for compressed air, the piston/cylinder arrangement being connected to the storage tank.

18. The apparatus according to claim 15, further comprising a line for conducting the pressurized gas, the line including at least one check valve for predetermining a flow direction.

* * * * *